Figure 1:
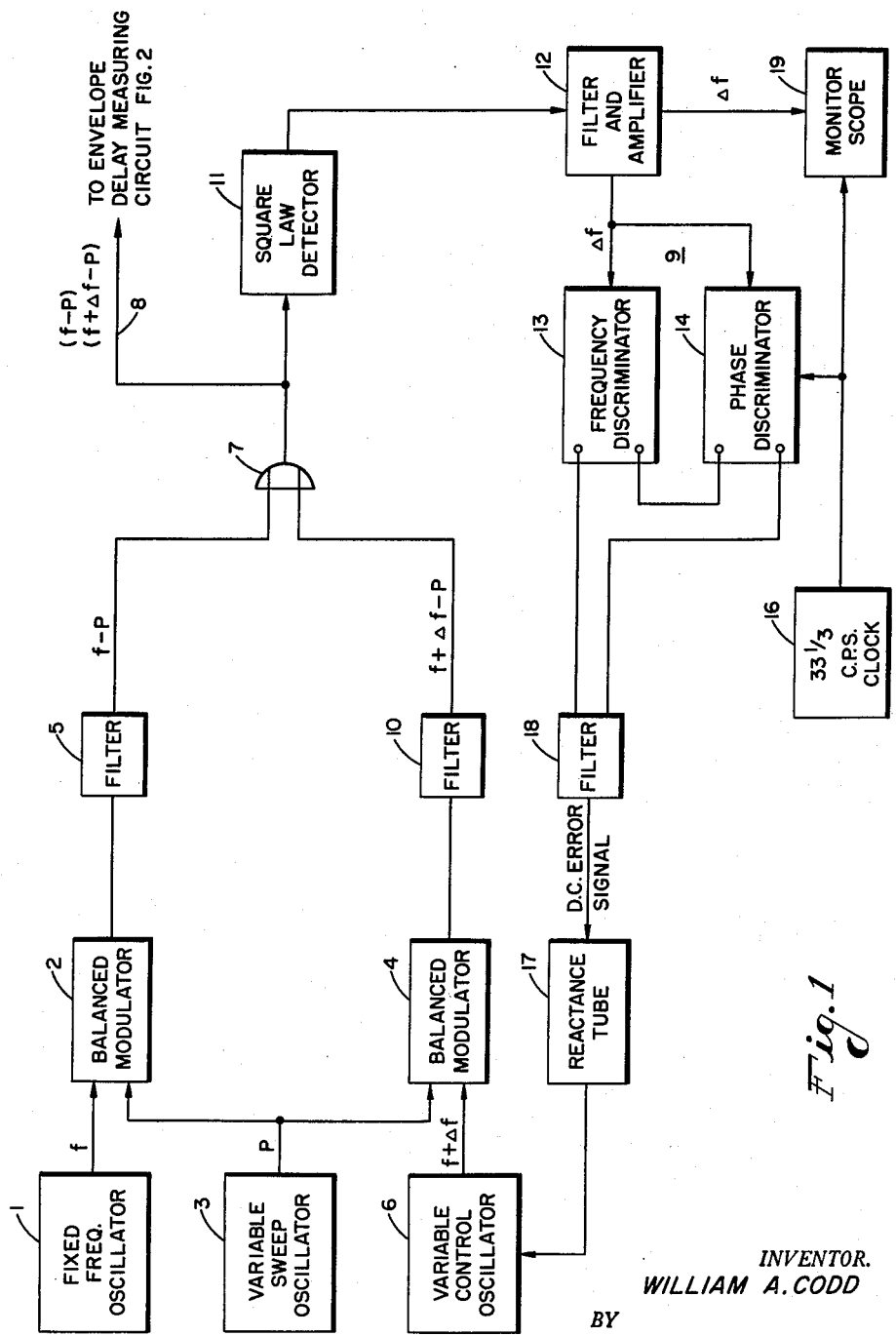

INVENTOR.
WILLIAM A. CODD
BY Robert L. Nathans
ATTORNEY

United States Patent Office 3,119,062
Patented Jan. 21, 1964

3,119,062
TEST CIRCUITRY FOR MEASURING ENVELOPE DISTORTION OVER A PARTICULAR FREQUENCY RANGE
William A. Codd, Rochester, N.Y., assignor to General Dynamics Corporation, Rochester, N.Y., a corporation of Delaware
Filed July 25, 1960, Ser. No. 44,923
3 Claims. (Cl. 324—57)

The present invention relates to circuitry for measuring envelope delay distortion over a particular frequency range. The accelerating use of transmission facilities for data transmission requires an increased knowledge and control of phase characteristics of the transmission facilities and their associated networks. These are commonly controlled by the specification of a related quantity designated as envelope delay. Specifications have been encountered calling for contol or equalization of a switching link to limits of ±10 microseconds envelope delay over a frequency range of 1000–2600 c.p.s. Such requirements call for equipment capable of accurately and rapidly measuring envelope delay. A network inserted between a given source and load will produce no distortion of wave form when the insertion loss and envelope delay characteristic due to the insertion are constant for all frequency components of the signal to be transmitted. If the signal in question is transmitted directly (not modulating a carrier), it also requires that the intercept of the phase characteristic on the phase axis at zero frequency be zero or an integral multiple of ±π radians. For a signal modulated on a carrier, the latter condition is not required.

The envelope delay characteristic is equal to the derivative of the phase shift characteristic in radians ($\beta$) with respect to frequency ($\omega$). Audio frequency measurements of envelope delay have been made indirectly by measuring the insertion phase shift at successive frequencies throughout the range of interest with sufficiently small frequency intervals so that calculations of $$\frac{\Delta \beta}{\Delta \omega}$$

for measurements at adjacent frequencies may be used as an approximation of envelope delay. Determination of $$\frac{\Delta \beta}{\Delta \omega}$$

or envelope delay, at a particular point by means of this method is very time consuming. This is largely due to the fact that the measurement of phase shift at each frequency must be preceded by a multistep balancing procedure. The method has the added disadvantage that to yield a specified precision in $\Delta \omega$, it is necessary to have a higher order of precision for each test frequency setting. As a result, a given percentage error in the test frequencies may result in as much as one hundred times this percentage error in the resultant determination of envelope delay. The test circuitry of the present invention has been developed to yield a precision of one microsecond for measurements of envelope delay distortion up to 166 microseconds. The present invention overcomes the disadvantage arising from the time consuming rebalancing of the phase meter at each test frequency as mentioned hereinabove. Means are provided for translating all test frequencies to a single frequency at the input terminals of the phase meter. A signal sweep generator is provided for producing test frequencies differing from each other by a suitably small increment, and feedback circuitry is provided to hold this increment constant as the test frequencies are swept through the desired test range. After the test signals are simultaneously passed through the circuit whose envelope delay characteristics are to be determined, the difference frequency is derived and thereafter applied to an input circuit of a phase meter.

Accordingly, it is a principal object of the present invention to provide improved circuitry for measuring envelope delay characteristics over a particular frequency range.

It is a further object of the present invention to provide an improved circuit for measuring envelope delay over a particular frequency range, very accurately, and in a very short time interval.

It is yet a further object of the present invention to provide an extremely accurate test signal generator for producing a pair of sweep frequencies to be utilized in measuring envelope delay, said pair of sweep frequencies being separated by a relatively small and precise difference in frequency during the process of sweeping through the test range.

It is a principal feature of the present invention to provide a signal generator which produces a pair of sweep frequencies which are introduced into the input circuit of an associated measuring circuit which employs non-linear impedance devices, such as square law detectors, to convert the sweep frequencies as they are swept through the test range into a constant frequency at the input circuits of the phase meter, thereby to cause the meter to accurately indicate envelope delay over the test range without having to continually recalibrate the phase meter.

It is a further feature of the present invention to provide a novel signal generator for producing a pair of sweep frequencies having a frequency difference which is controlled precisely by a feedback loop utilizing a frequency discriminator and a phase discriminator operating concurrently.

Further objects, features and advantages of the present invention will become apparent as the following description proceeds, and features of novelty which characterize the invention will be pointed out in particularity in the claims annexed to and forming a part of this specification.

For a better understanding of the invention, reference may be had to the accompanying drawings, in which:

FIG. 1 discloses the aforementioned sweep signal generator, and

Figure 2:
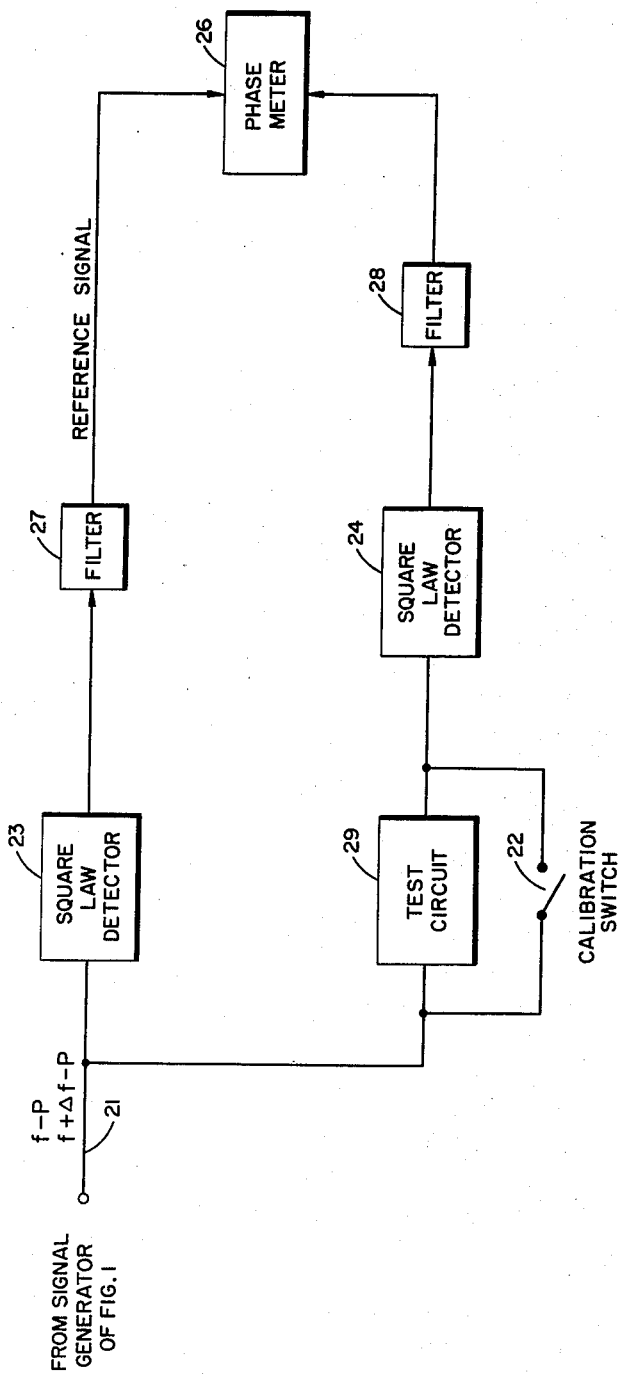

FIG. 2 discloses the circuitry for measuring the envelope delay characteristic of a test circuit.

Referring now to FIG. 1 of the drawings, a fixed frequency oscillator 1 is disclosed coupled to a first input terminal of balanced modulator 2. Oscillator 1 produces a fluctuating singal having a frequency $f$, which may be 250 kc. Variable sweep oscillator 3 is disclosed, having an output circuit coupled to a second input terminal of balanced modulator 2. The frequency of the signal produced by sweep oscillator 3 may vary between $f$—500 c.p.s. and $f$—3200 c.p.s. The output circuit of variable sweep oscillator 3 is also coupled to a first input terminal of balanced modulator 4, and the output circuit of variable control oscillator 6 is coupled to a second in put terminal of balanced modulator 4. When the generator is operating ideally, the frequency of the singal produced by variable control oscillator 6 will be 250 kc. plus 33⅓ c.p.s. ($f+\Delta f$). Balanced modulators 2 and 4 are coupled to the input terminals of combining means 7 through filters 5 and 10, which eliminate the $f+P$ and $f+\Delta f+P$ signals, so that the difference signals $f-P$ and $f+\Delta f-P$ produced in the balanced modulators are combined to be impressed upon output lead 8 and so that two sweep frequency signals are transmitted to the envelope delay measuring circuit of FIG. 2, said signals having a difference between them frequency-wise of $\Delta f$ (33⅓ c.p.s.).

The purpose of the feedback circuit 9 is to maintain $\Delta f$ constant as the signal generator sweeps through the audio frequency range. Square law detector 11 produces a signal having a frequency of $\Delta f$ as is known in the modulation art. For a mathematical analysis of this phenomenon, see United States Patent No. 3,011,135 of T. M. Stump and J. D. Torpie, assigned to the same assignee as the present invention. This signal is forwarded through the filter and amplifier unit 12 to the input circuit of phase discriminator 14. Other signals produced by the square-law detector 11 are blocked by filter 12. Frequency discriminator 13 may be of any type well known in the art which produces a D.C. voltage proportional to the difference between the input frequency and a standard frequency.

Clock pulse source 16 is coupled to phase discriminator 14 so that a voltage is produced in the output circuit of phase discriminator 14 having a voltage proportional to the difference in phase between $\Delta f$ applied to the input circuit of the discriminator and the signal produced by clock source 16. The output circuits of frequency discriminator 13 and phase discriminator 14 are coupled in series and are coupled to a standard reactance tube circuit 17 through a filter 18. Frequency discriminator 13 and phase discriminator 14 operate concurrently in the manner of a vernier device so that in the event that $\Delta f$ is of a different frequency than the signals produced by clock source 16, a fairly large D.C. error signal will be produced in the input circuit of reactance tube 17 by the operation of the frequency discriminator, whereas slight changes between the phase of $\Delta f$ and the singals produced by clock source 16 will cause a relatively small D.C. error voltage to be produced by phase discriminator 14. The overall result is that a D.C. error signal will be transmitted to the reactance tube 17 as long as $\Delta f$ and the signals produced by clock source 16 are not exactly in phase. If desired, oscilloscope 19 may be connected to observe the relationship between $\Delta f$ and the singals produced by clock source 16 visually. The reactance tube circuit 17 coacts with the variable control oscillator 6 in the conventional manner to change its frequency of operation $(f+\Delta f)$, until $\Delta f$ and the signals produced by the clock source 16 are locked in phase. It should be noted that regardless of whether the freqency of the signals produced by oscillators 1, 3, or 6 are shifting, the frequency of operation of control oscillator 6 will be changed by virtue of the feedback loop 9 so that $\Delta f$ is locked in phase with the 33⅓ c.p.s. clock pulse source to maintain the required precise frequency difference between the two sweep frequencies.

Referring now to FIG. 2 of the drawings, the two sweep frequencies $f-P$ and $f+\Delta f-P$ are applied to the envelope delay measuring circuit over input lead 21. Calibration switch 22 is closed so that the sweep signals are simultaneously applied to square law detectors 23 and 24. The output circuits of the square law detectors are coupled to the input circuits of phase meter 26 through filters 27 and 28, as shown. A signal is produced by the operation of square law detector 23 having a frequency of $\Delta f$ which signal passes through filter 27 and is applied to the first input terminal of phase meter 26. Filter 27 blocks the other signals produced by square law detector 23 which are potential sources of error. Square law detector 24 and filter 28 operate in like manner and, accordingly, when calibration switch 22 is closed, phase meter 26 should not give any indication since the envelope delay of the square law detector and filter in each branch of the circuit should be identical. Test circuit 29 is electrically connected into the measuring circuit upon the opening of calibration switch 22. Test circuit 29, is, of course, the circuit whose envelope delay characteristics are to be measured over a particular frequency range. As discussed more fully in the aforementioned copending application, a square law detector will produce a signal having a frequency $\Delta f$, whose phase is directly proportional to envelope delay. Accordingly, as variable sweep oscillator 3 sweeps through its operating range, phase meter 26 will indicate the envelope delay of test circuit 29 over the range of operation. Phase meter 26 could, of course, include a recording device thereby to produce a curve whose shape and amplitude are proportional to the envelope delay characteristic curve of the test circuit over the range of operation.

It should be particularly noted that the aforementioned modulation and demodulation processes produce signals in the input circuits of phase meter 26 whose relative phase difference is a measure of envelope delay. The frequency of the input signals to phase meter 26 ($\Delta f$) remains the same although the envelope delay characteristics of test circuit 29 are measured over the audio frequency range and, as a result, phase meter 26 need not be rebalanced as was the case in the operation of prior art circuitry.

It should be specifically understood that detectors 23 and 24 need not operate according to a second degree parabolic curve but may be any non-linear impedance device and it should also be understood that the operating range for the circuitry of the present invention are not restricted to the ranges set forth in the specification by way of example.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. A signal generator comprising, first means for producing a fluctuating signal, second means for producing a fluctuating signal which varies in frequency over a given time interval, third means coupled to the output circuits of said first and second means for producing a signal having a frequency equal to the difference in frequency between the fluctuating signals produced by said first and second means, fourth means for producing a fluctuating signal having a frequency which differs from the frequency of the fluctuating signal produced by said first means, fifth means coupled to the output circuits of said second and fourth means for producing a fluctuating signal having a frequency substantially equal to the difference in frequency between the fluctuating signals produced by said second and fourth means, sixth means coupled to the output circuits of said third and fifth means for deriving a signal having a frequency substantially equal to the difference in frequency between the fluctuating signals produced by said first and fourth means, a clock pulse generator, seventh means for comparing the frequency of the signal produced by said sixth means with the frequency of a fluctuating signal produced by said clock pulse generator, means responsive to a difference in frequency or phase between the signal produced by said sixth means and the signal produced by said clock pulse generator for changing the frequency of the signal produced by said fourth means until this latter difference is eliminated.

2. The combination as set forth in claim 1 wherein said seventh means further comprises a frequency discriminator and a phase discriminator each having their output circuits connected in series with one another.

3. A test set for the measurement of envelope delay comprising, means for generating a pair of test signals each of which changes frequency-wise in the same sense over a time interval so that a substantially constant difference in frequency is maintained between said test signals over said interval, a phase meter having first and second input circuits, first means having an output circuit coupled to said means for generating for deriving a reference signal having a frequency equal to the difference between the frequencies of said test signals, means for coupling the output circuit of said first means to the first input circuit of said phase meter, a test circuit having an input and an output circuit, means for applying said test signals produced by said means for generating to the input circuit of said test circuit, second means having an input circuit and an output circuit for deriving a signal having a frequency equal to the difference between the frequencies of said test signals, means for coupling the input circuit of said second means to the output circuit of said test circuit, means for coupling the output circuit of said second means to the second input circuit of said phase meter so that said phase meter indicates the envelope delay of said test circuit over a particular range of frequencies, said means for generating further comprising first means for producing a fluctuating signal, second means for producing a fluctuating signal which varies in frequency over a given time interval, third means coupled to the output circuits of said first and second means for producing a signal having a frequency equal to the difference in frequency between the fluctuating signals produced by said first and second means, fourth means for producing a fluctuating signal having a frequency which differs from the frequency of the fluctuating signal produced by said first means, fifth means coupled to the output circuits of said second and fourth means for producing a fluctuating signal having a frequency substantially equal to the difference in frequency between the fluctuating signals produced by said second and fourth means, sixth means coupled to the output circuits of said third and fifth means for deriving a signal having a frequency substantially equal to the difference in frequency between the fluctuating signals produced by said first and fourth means, a clock pulse generator, seventh means for comparing the frequency of the signal produced by said sixth means with the frequency of a fluctuating signal produced by said clock pulse generator, means responsive to a difference in frequency or phase between the signal produced by said sixth means and the signal produced by said clock pulse generator for changing the frequency of the signal produced by said fourth means until the difference is eliminated.

References Cited in the file of this patent

UNITED STATES PATENTS

| | | |
|---|---|---|
| 2,692,947 | Spencer | Oct. 26, 1954 |
| 2,756,390 | Albersheim | July 24, 1956 |
| 2,760,155 | Kelly | Aug. 21, 1956 |
| 2,778,993 | Young | Jan. 22, 1957 |
| 2,794,956 | Fox | June 4, 1957 |
| 2,851,658 | Howson | Sept. 9, 1958 |
| 2,929,020 | Mayes | Mar. 15, 1960 |
| 2,970,258 | Sinclair | Jan. 31, 1961 |

OTHER REFERENCES

Ring: The Measurement of Delay Distortion in Microwave Repeaters, Bell System Tech Journal, vol. 27, April 1948, pp. 247–264.